G. LYON.
Nut Lock.

No. 231,338. Patented Aug. 17, 1880.

Witnesses:

Inventor:
George Lyon

UNITED STATES PATENT OFFICE.

GEORGE LYON, OF SUNBURY, PENNSYLVANIA, ASSIGNOR OF ONE-HALF OF HIS RIGHT TO SIMON P. WOLVERTON, OF SAME PLACE.

NUT-LOCK.

SPECIFICATION forming part of Letters Patent No. 231,338, dated August 17, 1880.

Application filed October 24, 1879.

*To all whom it may concern:*

Be it known that I, GEORGE LYON, of Sunbury, Northumberland county, Pennsylvania, have invented a new and Improved Nut-Lock; and I do hereby declare that the following is a full and exact description thereof, reference being had to the accompanying drawings, and to the letters of reference marked thereon, in which—

Figure 1:
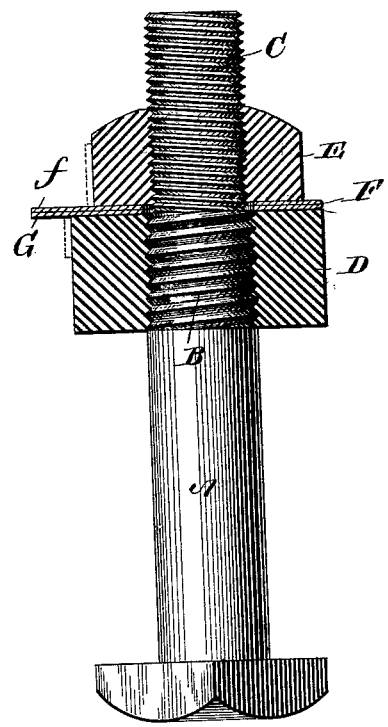
Figure 2:
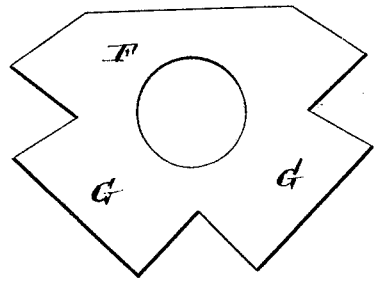

Figure 1 is a vertical elevation of the bolt with the nuts and lock applied thereto, the nuts and lock being in sections; and Fig. 2 a plan of the lock detached from bolt and nuts.

My invention relates to nut-locks; and it consists in a piece of metal doubled and cut so as to be applied to a bolt between a right and left hand nut, and adapted to bind both nuts on the same side of the bolt and on one or more sides of the nut, as hereinafter described.

In the accompanying drawings, the letter A indicates the bolt provided with right and left hand threads on that portion on which the nuts screw, the right-hand-threaded portion B being of somewhat larger diameter than the left-hand portion C.

The right-handed nut D is first screwed on, and after that the left-handed nut E. In both cases the threaded opening in the nut is of the same diameter from top to bottom, whereby the nut is caused to be of the same strength from top to bottom, it not being weakened by one portion being cut away more than another. If the bolt should be too long it is shortened by inserting leather or metal washers between the head of the bolt and the nut. These washers are not illustrated, because they are of the ordinary form and involve no invention in their construction.

My locking-plate consists of a piece of sheet metal or other suitable material, F, doubled one portion upon the other, and then cut by means of a die, chisel, shears, or otherwise into the form substantially illustrated in Fig. 2 of the drawings, so as to form lips G, which, when the plate is inserted between the two nuts, as illustrated in Fig. 1, may be turned one down against the right-hand nut and the other up against the left-hand nut, as shown by dotted lines in Fig. 1, thereby binding both nuts on the same side of the bolt and on different sides of the nuts, whereby the nuts are more securely bound and prevented from turning, and one portion of the lock-plate is prevented from turning on the other.

I do not claim a nut-lock made of a single piece of metal encircling a bolt between a right and left hand nut and bent so that one end will bind one nut and the other end the other nut, but on different sides of the bolt, the openings in the nut being of larger diameter at one point than at another, as illustrated in the patent to W. C. Mason, October 12, 1869, No. 95,704; but What I do claim is—

The bolt A, provided with right and left hand threads C B and nuts D and E, jointly with the plate F, made of metal doubled and provided with lips G, and located between the nuts, and adapted to bind the same, as described, for the purposes set forth.

GEO. LYON.

Witnesses:
J. K. DAVIS, Jr.,
GEO. H. NEFF.